US011258872B1

(12) United States Patent
Gogel

(10) Patent No.: US 11,258,872 B1
(45) Date of Patent: Feb. 22, 2022

(54) TECHNIQUES FOR ACCELERATING PAGE RENDERING

(71) Applicant: Amazon Technologies, Inc., Seattle, WA (US)

(72) Inventor: Edward Dean Gogel, St. Helena, CA (US)

(73) Assignee: Amazon Technologie, Inc., Seattle, WA (US)

( * ) Notice: Subject to any disclaimer, the term of this patent is extended or adjusted under 35 U.S.C. 154(b) by 0 days.

(21) Appl. No.: 17/117,473

(22) Filed: Dec. 10, 2020

(51) Int. Cl.
| | |
|---|---|
| *H04L 29/08* | (2006.01) |
| *G06Q 20/06* | (2012.01) |
| *G06Q 20/38* | (2012.01) |
| *H04L 29/06* | (2006.01) |
| *H04L 67/56* | (2022.01) |
| *H04L 61/4511* | (2022.01) |
| *H04L 61/5007* | (2022.01) |

(52) U.S. Cl.
CPC .......... *H04L 67/28* (2013.01); *H04L 61/1511* (2013.01); *H04L 61/2007* (2013.01)

(58) Field of Classification Search
CPC ... H04L 67/28; H04L 61/1511; H04L 61/2007
See application file for complete search history.

(56) References Cited

U.S. PATENT DOCUMENTS

| | | | | |
|---|---|---|---|---|
| 6,119,078 A * | 9/2000 | Kobayakawa | ........ | G06F 40/221 704/3 |
| 10,999,337 B1 * | 5/2021 | Ledet | ................. | H04L 65/4053 |
| 2006/0271352 A1 * | 11/2006 | Nikitin | .................... | G06F 40/58 704/9 |
| 2011/0161180 A1 * | 6/2011 | Sullivan | ................. | G06Q 30/02 705/14.69 |
| 2011/0191321 A1 * | 8/2011 | Gade | ......................... | G06F 3/14 707/709 |
| 2014/0281032 A1 * | 9/2014 | Roskind | ................. | G06F 16/95 709/245 |
| 2016/0212101 A1 * | 7/2016 | Reshadi | .............. | H04L 63/0414 |
| 2020/0128086 A1 * | 4/2020 | Lewis | .................. | H04L 67/146 |

FOREIGN PATENT DOCUMENTS

CN 104516889 A * 4/2015 ......... G06F 16/9574

* cited by examiner

*Primary Examiner* — Christopher B Robinson
(74) *Attorney, Agent, or Firm* — Kilpatrick Townsend & Stockton LLP

(57) ABSTRACT

Systems and methods are described herein for accelerating page rending times. In some embodiments, an intermediary proxy device may be utilized to accelerate page rending times experienced at an application operating at a user device. The intermediary proxy device may perform operations such as obtaining, on behalf of the application, first webpage content and second webpage content for a webpage, the first webpage content being obtained from the web server. In some embodiments, the intermediate proxy device may execute third-party code to obtain the second webpage content from a third party. In some embodiments, the intermediary proxy device may modify the second webpage content obtained from the content server from a first format to a second format the first webpage content and the second webpage content as modified to the application. The application may then perform one or more operations to present data at a display of the user device.

20 Claims, 9 Drawing Sheets

TECHNIQUES FOR ACCELERATING PAGE RENDERING

BACKGROUND

Web browsers often request content from multiple sources when loading a webpage. Additionally, browsers may send domain name system (DNS) requests to resolve addresses of the webpage before the user clicks on a link. Some content to be presented on the webpage may be selected at run time and can vary dynamically. As a result, the web browser may experience latency in rendering the webpage while it waits for the content to be selected. This can be frustrating to the user and result in a suboptimal user experience. Embodiments of the invention address these and other problems, individually and collectively.

BRIEF DESCRIPTION OF THE DRAWINGS

Various embodiments in accordance with the present disclosure will be described with reference to the drawings, in which.

DETAILED DESCRIPTION

Figure 1:
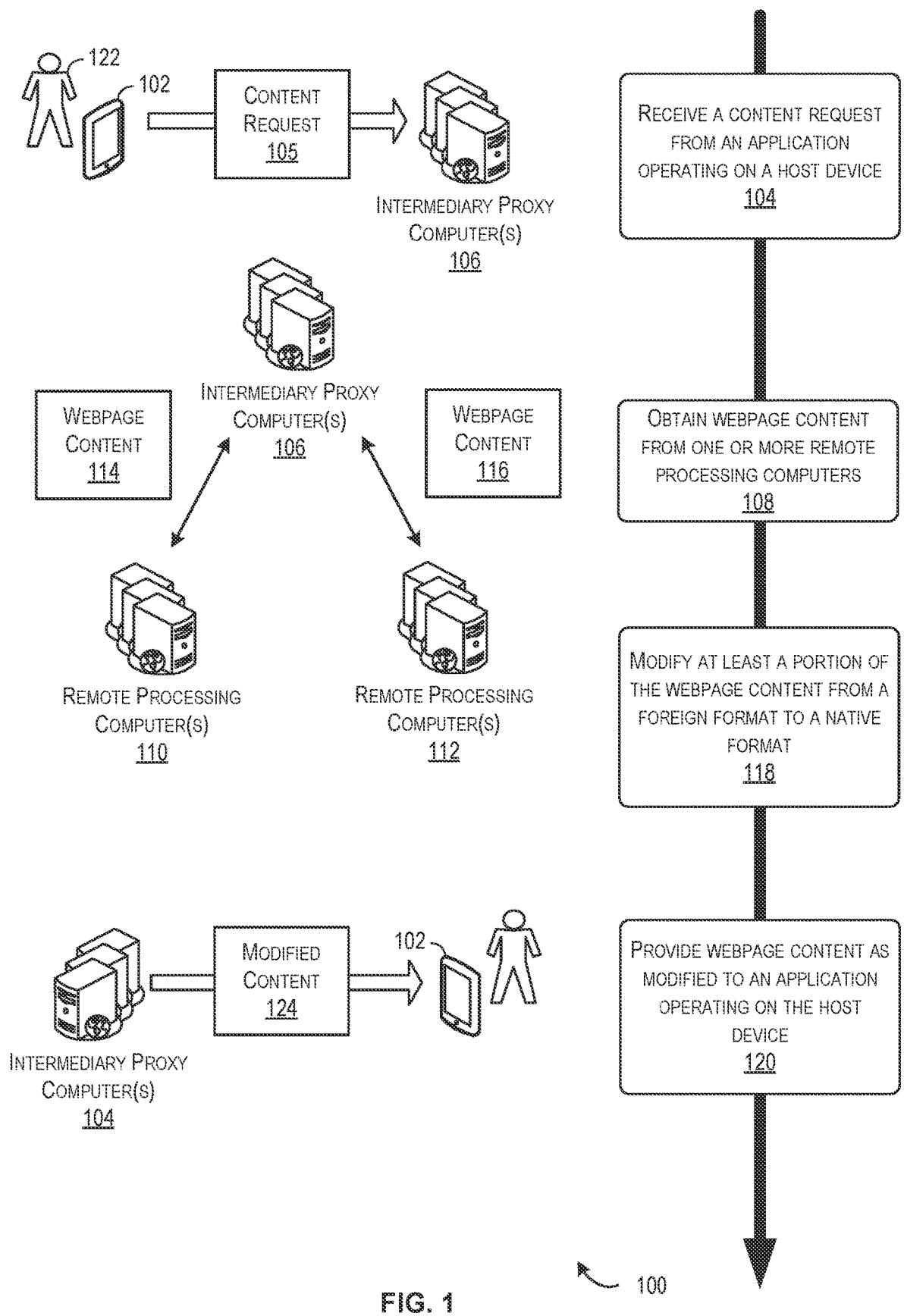
FIG. 1 is an example flow for accelerating page rendering at a user device, in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described herein are directed to utilizing an intermediary proxy computer to accelerate page rendering times, among other things, at a web browser or application executing at a user device. By way of example, operations that are conventionally performed by a web browser (e.g., transmitting domain name server (DNS) requests, transmitting content requests, executing code for requesting advertisements, etc.) may instead be executed by an intermediary proxy computer that has more processing resources and/or higher bandwidth connections to various remote processing computers (e.g., sources of content of a webpage requested by the web browser such as the publisher of the webpage, advertisement content providers/networks, audio/video content providers, and the like). Utilizing the intermediary proxy computer to fetch the webpage content causes the content to be rendered at the web browser faster than if the web browser requested the content directly from the content provider.

Additional benefits can be realized through the utilization of an intermediary proxy computer as discussed herein. By way of example, the intermediary proxy computer can be configured to predict subsequent link selections by the user and pre-fetch the webpage content for those links such that when the web browser is used to navigate to one such webpage, the time needed for rendering that page is even further decreased with respect to the time traditionally needed for the web browser to render that content of the webpage. This is at least because the content had already been obtained and cached by the intermediary proxy computer and therefore, the intermediary proxy computer can immediately provide the content upon receiving a request from the web browser.

In some embodiments, the intermediary proxy computer requests content from one or more remote processing computers. "Remote processing computers," as used herein, can include any suitable combination of web servers, advertisement network servers, video and/or audio content servers, and/or any suitable computer utilized to distribute any suitable data that is displayable at a webpage (referred to herein as "webpage content," or "content," for brevity). In some embodiments, content obtained by from the remote processing computers can differ in format. By way of example, a publisher of the webpage (e.g., an entity that authored the webpage) may provide content in one format (e.g., a first format, also referred to as "native content") while a remote processing computer of an advertisement network, for example, may provide content (e.g., advertisement content) in a different format (e.g., a second format, also referred to as "foreign content"). In some embodiments, the intermediary proxy computer may obtain webpage content convert any suitable portion of the webpage content from any suitable foreign format to the native format of the webpage. Thus, the intermediary proxy computer can be configured to cause foreign content to appear as if native to the webpage. This can make the content of the webpage feel more uniform and lessen, or even eliminate, any jarring side effect that might be experienced by the user were the content to be provided at the webpage in its original format. Thus, causing the content to blend in with the surroundings of the webpage can improve the quality of the user's experience.

At times, webpage content may be blocked from display by a software capability of the web browser and/or of the user device. By way of example, content (e.g., an ad) identified as originating from a particular provider or type of provider (e.g., an advertiser) may be blocked by an ad blocker capability of a web browser. An "ad-blocker" may refer to any suitable software that has a primary purpose of identifying advertisements so that they can be blocked from display. However, blocking advertisements from display can result in millions or even billions of lost revenue to advertisers. These loses continue to grow each year as more ad-blocking technology is adopted.

Typically ad-blockers identify advertisements based on matching a host and/or domain name of the content to a list of hostnames/domain names known to be associated with advertisers. Another tactic used by ad-blockers includes identifying advertising code embedded in the webpage content. This advertising code is usually executed by the web browser in order to request ad content from an advertisement network. The code itself can be identified by the ad-blocker which can then block the execution of the code, thereby keeping the webpage from displaying advertisements.

Ad-blockers are able to block advertisements using the techniques above because the domain and host names used to deliver advertisements typically belong to advertising networks or are easily identifiable as being different from the webpage provider (e.g., the publisher of the website). For example, an advertisement for a brand X shoe may be readily identified as being foreign to a webpage that is associated with brand Y. Additionally, the ad-blocker can easily identify advertising code because the same or very similar code is provided to every visitor. Still further, the ad-blocker can identify when ad-serving code (also referred to as "advertisement placement code") is executing on the user's web browser.

Advertisement placement code currently accounts for an average of 57% of the time needed for webpages to load across the top 4 million websites in the world. Site speed and page load speed greatly affect the conversion rate of websites. It has been estimated that every second of added load time decreases conversion rates by approximately 2%. Some search engines (e.g., Google) also include page speed as a major factor in search ranking, ranking sites that load faster above those that do not. Managing ad-serving code and advertising networks is also a challenge for publishers. Since code-execution time is outside of their control, publisher's sites are vulnerable to varying load times and the possibility of de-ranking or even de-indexing on search engines. By utilizing the techniques discussed above, the load times (also referred to as rendering times, the time between user selection of the URL/webpage and when the content associated with that webpage is fully displayed at the web browser (or other application of the user device)) may be significantly reduced to the benefit of the publisher.

Some or all of the process (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

Moving on to FIG. 1 which illustrates an example flow 100 for accelerating page rendering at a user device (e.g., user device 102), in accordance with at least one embodiment. The user device 102 may be any suitable device capable of rendering content (e.g., webpage data including visual and/or sound components) at one or more output devices (e.g., a display, a speaker, etc.). In some embodiments, The flow 100 may begin at 104, where a content request (e.g., content request 105) may be received from an application operating on a host device (e.g., the user device 102). In some embodiments, the content request may identify a particular uniform resource locator or any suitable identifier of a particular webpage. The content request may be received by intermediary proxy computer(s) 106. The intermediary proxy computer(s) 106 can individually be any suitable computing device. In some embodiments, the intermediary proxy computer(s) 106 can be operated by or on behalf of a cloud computing provider. In accordance with at least one embodiment, the application providing the content request is a web browser.

At 108, webpage content (e.g., the webpage content 114 and/or the webpage content 116) may be obtained (e.g., by the intermediary proxy computer(s) 106) from one or more remote processing computer(s) (e.g., remote processing computer(s) 110, remote processing computer(s) 112). "Remote processing computers," as used herein, can include any suitable combination of web servers, advertisement network servers, video and/or audio content servers, and/or any suitable computer utilized to distribute any suitable data that is displayable at a webpage (referred to herein as "webpage content," or "content," for brevity). As a non-limiting example, remote processing computer(s) 110 is a web server associated with the publisher of the webpage and the remote processing computer(s) 112 is an advertising network. In this example, the webpage content 114 is content provided by the publisher of the webpage (e.g., native content), while webpage content 116 may include one or more advertisements identified and provided by one or more advertisers via an advertisement network.

At 118, the intermediary proxy computer(s) 106 may modify at least a portion of the webpage content obtained from remote processing computer(s) 110 and/or 112. For example, webpage content 116 may be provided in a foreign format that is different from the webpage content 114 (e.g., native content for the webpage). In some embodiments, the intermediary proxy computer(s) 106 may be configured to convert the webpage content 116 (e.g., an advertisement) from its the foreign format to the native format of the webpage content 114. By way of example, if the publisher of the webpage is a social media provider, the webpage content 116 may be reformatted to look like content that originated from the social media page. For instance, the webpage content 116 could be reformatted to look like a social media post substantially similar to those provided by users of the social media webpage. In some embodiments, there may be some indication that the webpage content 116 originated from a source that is different from the publisher. For instance, the webpage content 116 as modified could be labeled with an identifier (e.g., "sponsored," "Ad," "foreign," etc.) that identifies the webpage content 116 as being foreign with respect to the webpage.

In some embodiments, webpage content 116 may include advertisement placement code (e.g., code that, when executed causes one or more advertisements to be placed within webpage content 114). In some embodiments, the webpage content 116 may be modified such that the source of the content is unidentifiable. In some embodiments, the webpage content 116 may be obfuscated based at least in part on the particular user device 102, any suitable information known about the user, and/or web browser with which content obtained using the webpage content 116 (e.g., advertisement placement code). By way of example, the content request 105 can include user-specific data (e.g., user device serial number, cookies, user demographic data, etc.) related to the user device and/or the user 122. In some embodiments, this information can be otherwise obtained by the intermediary proxy computer(s) 106. Any suitable portion of the user-specific data may be utilized in the operations executed to obfuscate the webpage content 116. Thus, in some embodiments, the same webpage content (e.g., webpage content 116) can be obfuscated differently between one user and another, making the webpage content 116 more difficult, if not impossible, for ad blocking software to identify.

At 120, the webpage content as modified (e.g., modified content 124 including the webpage content 114 and the webpage content 116 as modified) may be provided by the intermediary proxy computer(s) 104 to an application (e.g., the web browser) operating on the host device (e.g., user device 102).

There are many advantages to providing the functionality described above at the intermediary proxy computer(s) 106 rather than at the user device 102. For example, the intermediary proxy computer(s) 106 have higher bandwidth, lower-latency connections to at least some of the remote processing computer(s) (e.g., advertising networks), 2) the intermediary proxy computer(s) can completely eliminate any code from executing on the user device's browser or can obfuscate the code on a per-user and/or per-device, rather than per-site basis, and 3) utilization of the intermediary proxy computer(s) 106 eliminates third-party advertising code from loading on visitor's browsers. This code can be unreliable and/or unpredictable, leading to poor user experiences.

Figure 2:
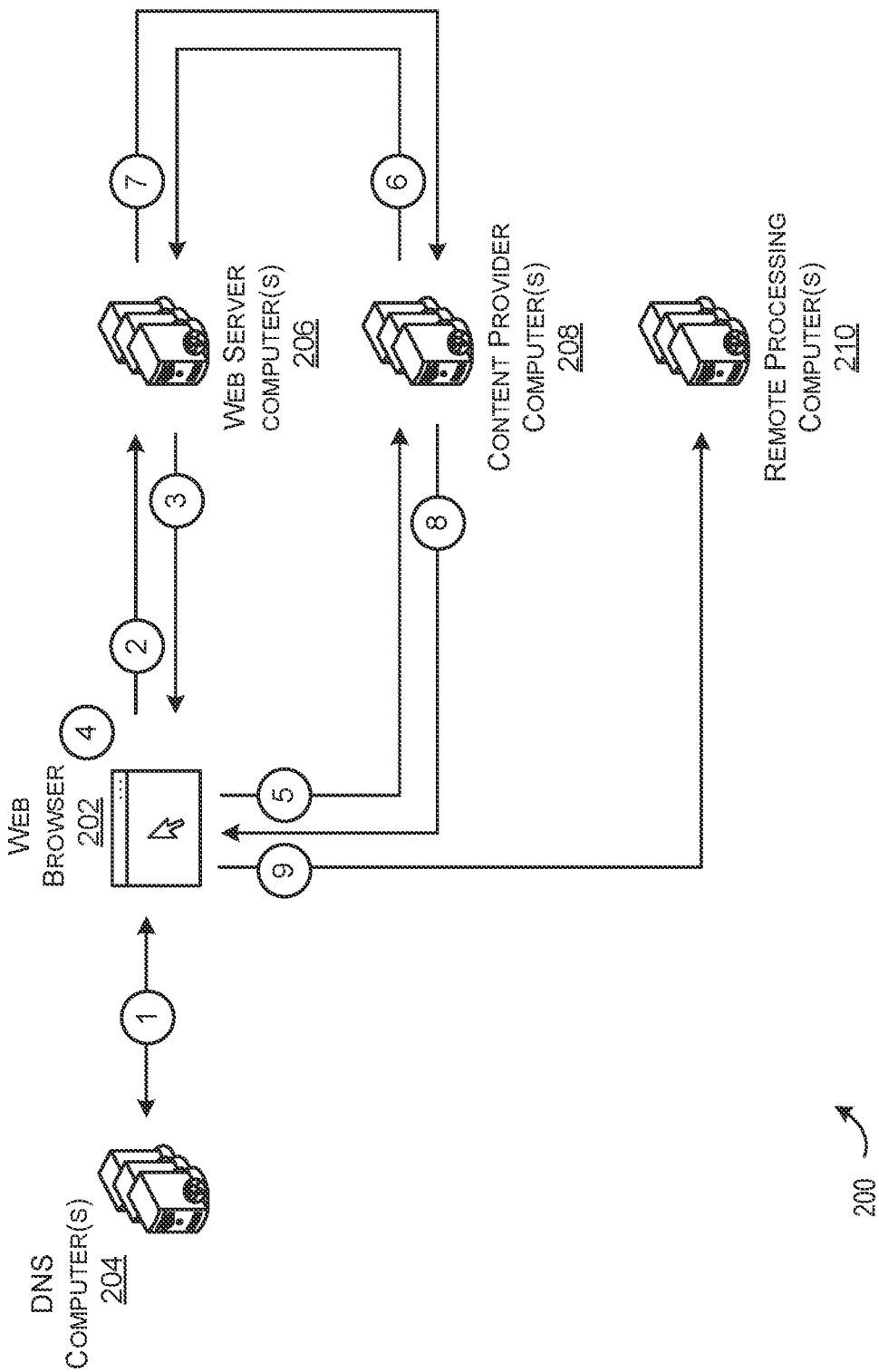
FIG. 2 is a flow illustrating a conventional method for rendering content at a web browser.

FIG. 2 is a flow illustrating a conventional method 200 for rendering content at an application (e.g., web browser 202, an application operating at user device 102 of FIG. 1). The user may utilize any suitable user interface and/or input device to navigate to a particular webpage associated with a particular uniform resource locator (URL). For example, user input such as a URL may be received at an interface of the user device. The method 200 may begin immediately after the user's navigational input is received. Prior to the execution of method 200, it is presumed that web server computer(s) 206 (e.g., computers operated by or on behalf of the publisher of the selected webpage, computer(s) that host the website that includes the requested webpage) has previously received advertisement placement code from the content provider computer(s) 208 (an advertisement network, an example of the remote processing computer(s) 112 of FIG. 1). The advertisement placement code is static (e.g., the same for every user/user device). The advertisement placement code is conventionally executed by the web browser 202 when the webpage is loaded to obtain one or more instances of content (e.g., advertisements) from the content provider computer(s) 208 (e.g., an advertisement network such as an advertisement auction or other suitable content provider). An "advertisement network," as used herein, refers to a platform that serves as a broker between one or more publishers (e.g., webpage providers) and a group of advertisers (e.g., content providers). Advertisement networks traditionally collect unsold advertisement space from multiple publishers and offer the pool of impressions to advertisers at a discounted rate.

At step 1, in response to user input indicating the user desires to navigate to a particular webpage (referred to as the target webpage), the web browser 202 transmits any suitable number of DNS requests to DNS computer(s) 204. By way of example, the web browser 202 may transmit a DNS request for the target webpage requested by the user. The DNS computer(s) 204 may be any suitable device (e.g., recursive resolvers, root name servers, top level domain (TLD) name servers, and/or authoritative name servers) configured to translate domain names and/or hostnames to their corresponding numeric internet protocol (IP) addresses from which content may be obtained. The web browser 202 may receive the IP address of the requested webpage from DNS computer(s) 204.

At step 2, the web browser 202 transmits a page request to the web server computer(s) 206 using the IP address received from DNS computer(s) 204. In some embodiments, the page request can be in the format of an HTTP page request. The page request may include any suitable data (e.g., IP address) for identifying the data and/or webpage requested.

At step 3, the web server computer(s) 206 may transmit web content (e.g., webpage content 114 of FIG. 1) to the web browser 202 in response to the page request. In some cases, the web content may include the advertisement placement code (e.g., webpage content 116 of FIG. 1) that was previously provided to the web server computer(s) 206 by the content provider computer(s) 208. For example, the advertisement placement code can be embedded in the webpage content 114 or the advertisement placement code may be a reference to a location from which the actual code may be obtained.

At step 4, the web browser 202 executes any suitable operations to process the advertisement placement code. By way of example, the web server computer(s) 206 may execute any suitable number of additional DNS requests (e.g., for advertising code sources identified in the embedded data, for advertising code dependencies from resolved hosts). If the advertising code itself is not embedded in the webpage content 114, the web server computer(s) 206 may be configured to download the advertising code using the IP address(es) provided by any suitable number of DNS responses from DNS computer(s) 204. In some embodiments, the web browser 202 may transmit any suitable number of domain name system (DNS) requests to DNS computer(s) 204, for adverting code assets. In some cases, the DNS computer(s) 204 may return the hostname for the content provider computer(s) 208.

At step 5, the web browser 202 requests web content (e.g., webpage content 116 of FIG. 1) from content provider computer(s) 208. In some embodiments, one or more requests can be transmitted from the web browser to the content provider computer(s) 208. The request typically uses the hostname of the content provider computer(s) 208.

The content provider computer(s) 208 may be configured to identify contextual data associated with the target webpage (e.g., the webpage hosted by the web server computer(s) 206. In some embodiments, the content provider computer(s) 208 may periodically index various webpages, including the target webpage and identify various content of the page (e.g., webpage content 114 which may include text, images, hyperlinks, and/or any suitable data associated with the webpage. If indexed, the content provider computer(s) 208 may cache or otherwise store this data for subsequent use. The indexing process described can be performed as a separate process and at any suitable time, according to any suitable periodicity or schedule. In some embodiments, contextual data indicating the various content of the webpage may be included in the request transmitted at step 5.

At step 6, if contextual data has not been previously indexed or included in the request transmitted at step 5, the content provider computer(s) 208 may transmit a page request to the web server computer(s) 206. In some embodiments, the page request may be substantially similar to the page request transmitted by the browser at step 2.

At step 7, the content provider computer(s) 208 receive webpage content (e.g., webpage content 114) from which contextual data of the webpage may be derived/identified. It should be appreciated that steps 6 and/or 7 may be performed at any suitable time, according to a predefined periodicity and/or schedule, and not necessarily in response to the request transmitted at step 5.

At step 8, the content provider computer(s) 208 may identify one or more instances of content (e.g., advertisements) to be presented at the webpage based on the contextual data associated with the webpage that was obtained using any of the techniques discussed above.

Once identified, the advertisements may be transmitted to the web browser 202.

At step 9, a user may be redirected to a webpage associated with a particular advertiser. By way of example, a user may click on an advertisement. In response to the selection, the web browser 202 may transmit a page request to the remote processing computer(s) 210 for web content associated with the hosted web page. The page request may utilize the hostname of the particular advertiser.

Conventional ad-blocking software can easily identify advertisements based at least in part on monitoring content requests that include hostnames that correspond to a list of known advertisers. In some embodiments, ad-blocking software can identify when substantially similar and/or the same code (e.g., advertisement code) is being provided to over some threshold number of web browsers, which can be an indication that the requested data includes advertisement placement code. In response to identifying this code in a particular response from the web server, the ad-blocking software may perform any suitable operation to restrict the web browser from executing the code such that the advertisement(s)/asset(s) are never requested by the web browser.

Figure 3:
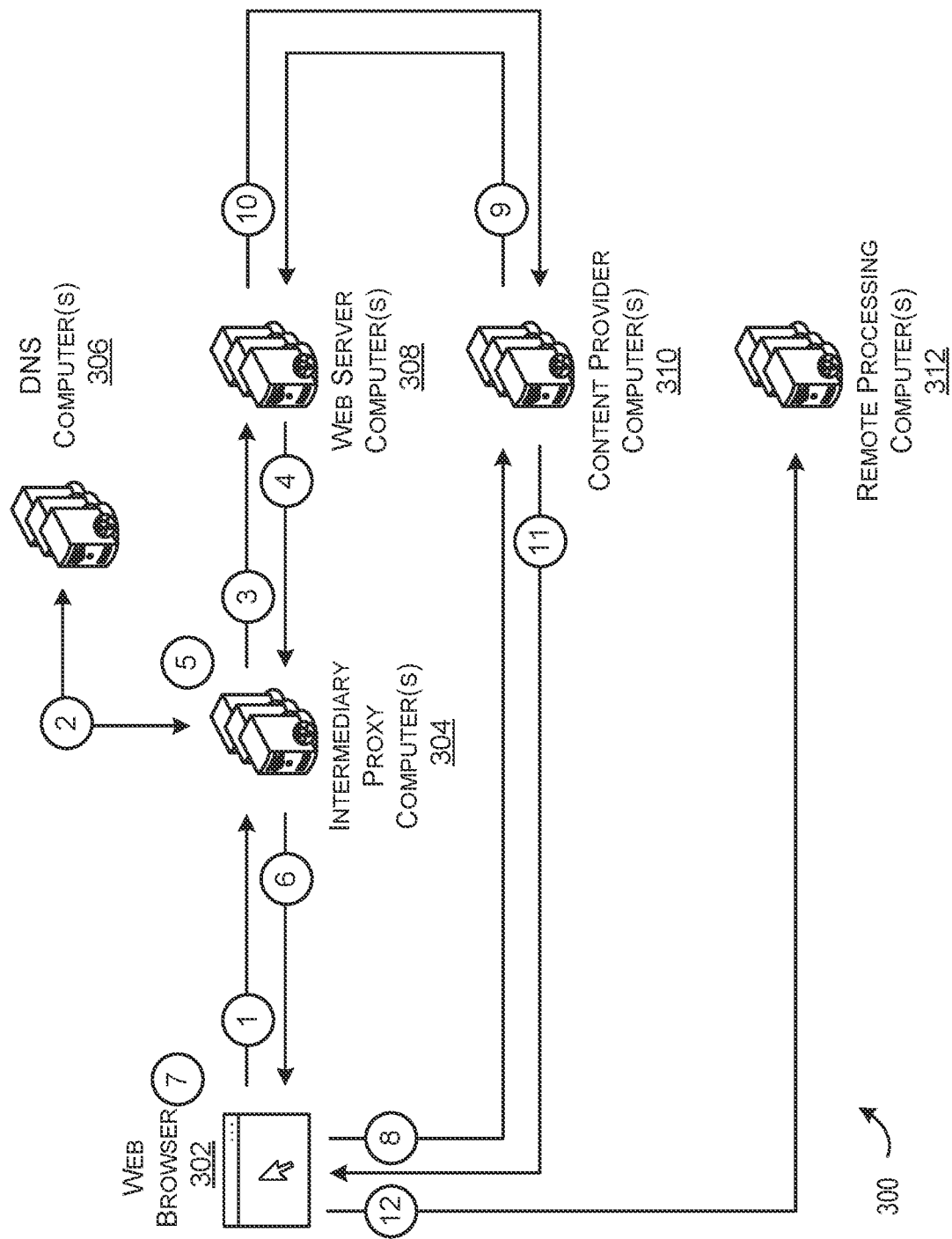
FIG. 3 is a flow illustrating another example method for rendering content at an application executing on a user device, in accordance with at least one embodiment.

FIG. 3 is a flow illustrating another example method 300 for rendering content at an application (e.g., a web browser 302) executing on a user device utilizing an intermediary proxy computer (e.g., intermediary proxy computer(s) 304, an example of the intermediary proxy computer(s) 106 of FIG. 1), in accordance with at least one embodiment. In method 300, the DNS request functionality is moved to the intermediary proxy computer(s) 304 to reduce the overall processing time of the web browser 302. As the intermediary proxy computer(s) 304 likely have faster and/or a greater number of processing resources then accessible to the web browser, and potentially higher bandwidth, lower latency connections to the DNS computer(s) 306 (an example of the DNS computer(s) 204 of FIG. 2), the intermediary proxy computer(s) 304 are poised to execute DNS requests faster than possible if executed at the web browser 302.

The method may begin at step 1, the web browser 202 transmits a page request to the web server computer(s) 206 using the hostname of the webpage selected by the user. In some embodiments, the page request can be in the format of an HTTP page request. The page request may include any suitable data for identifying the data and/or webpage requested.

At step 2, the intermediary proxy computer(s) 304 may intercept the page request and transmit a DNS request to the DNS computer(s) 306. DNS computer(s) 306 may transmit the IP address (e.g., a geo-corrected IP address) corresponding to the requested page in response to the request at step 2.

At step 3, the intermediary proxy computer(s) 304 forwards the page request to the web server computer(s) 308 (e.g., an example of the web server computer(s) 206 of FIG. 2) using the IP address provided by the DNS computer(s) 306.

At step 4, the web server computer(s) 308 may transmit web content (e.g., webpage content 114 of FIG. 1) to the intermediary proxy computer(s) 304 in response to the page request. In some cases, the web content may include publisher-provided content and/or advertisement placement code (e.g., webpage content 116 of FIG. 1) that was previously provided to the web server computer(s) 308 by the content provider computer(s) 310 (e.g., an example of the content provider computer(s) 208 of FIG. 2). For example, the advertisement placement code (e.g., webpage content 116) can be embedded in the webpage content 114 or the advertisement placement code may be a reference to a location from which the actual code may be obtained.

At step 5, the intermediary proxy computer(s) 304 may process, on behalf of the web browser 202, the web content received from the web server computer(s) 308. This can include transmitting any suitable number of DNS requests to identify IP addresses for any suitable webpage content (e.g., the IP addresses corresponding to content provider computer(s), downloading assets (e.g., images, sound files, video files, etc.), or the like. In some embodiments, the intermediary proxy computer(s) 304 may replace hostnames of the web content as provided by the web server computer(s) 308 with the corresponding IP addresses provided by the DNS computer(s) 306.

In some embodiments, the intermediary proxy computer(s) 304 may modify at least a portion of the webpage content such as the embedded advertisement placement code or the reference, if used, to the source of the advertisement placement code. Modifying the webpage content may include obfuscating the advertisement placement code and/or the reference to the source of the advertisement placement code such that it is unidentifiable. This could include removing some portions of the code, modifying hostnames with corresponding IP addresses, or the like. In some embodiments, the intermediary proxy computer(s) 304 may perform operations for obfuscation that are based at least in part on the particular web browser, the user, and/or user device on which web browser 302 executes. By way of example, the page request transmitted at step 1 can include user-specific data related to the user device and/or the user of web browser 302 and/or the web browser 302 itself. In some embodiments, this information can be otherwise obtained by the intermediary proxy computer(s) 304. Any suitable portion of the user-specific data may be utilized in the operations executed to obfuscate any suitable portion of the webpage content obtained from web server computer(s) 308. Thus, in some embodiments, the same webpage content can be obfuscated differently between one user and another, making the webpage content (e.g., the advertisement placement code, the reference to the source of the advertisement placement code from which the code can be obtained, etc.) more difficult, if not impossible, for ad-blocking software to identify.

At step 6, the intermediary proxy computer(s) 304 may forward the web content, now including the IP addresses obtained from the DNS computer(s) 306 to the web browser 302. If the intermediary proxy computer(s) 304 obfuscated some portion of the webpage content obtained from web server computer(s) 308, the obfuscated data may be included in the data forwarded to the web browser 302 at step 6.

Steps 7-12 generally correspond to steps 4-9 of FIG. 2, with the exception that the web browser 302 may request content (e.g., advertisements) from the remote processing computer(s) 312 (e.g., an example of the remote processing computer(s) 210 of FIG. 2) using the geo-corrected IP address obtained by the intermediary proxy computer(s) 304. It should be appreciated that, in some embodiments, step 8 (and any suitable request for an advertisement in any of the examples provided herein) may include user-specific data associated with the user such as an identifier of the user, user demographic information, historical webpages visited by the user, historical purchase, cookies, or any suitable information about the user. In some embodiments, the content provider computer(s) 310 (and/or the content provider computer(s) of FIGS. 4 and/or 5) may utilize the user-specific data when identifying the particular content to serve in response to the content request.

Thus, using the techniques discussed in connection to FIG. 3, the intermediary proxy computer(s) 304 could work directly with the current web-infrastructure, replacing host names found throughout the site with their corresponding geo-corrected IP addresses. Although domain names or host names are easily tracked back to advertisers, the IP addresses to which they geo-map are usually quite anonymous and are usually owned by hosting, CDN or edge network providers and not the advertisers themselves. An ad-blocker is only useful because it allows normal content to pass. If an ad-blocker were to block these widely used hosting-provider addresses, it would no longer be able to allow the normal content to pass, making it unusable.

This solution not only decreases page loads times through code execution time, but also eliminates the time needed for on-page DNS resolution. DNS queries generally take between 5 ms to 50 ms each, but in some cases can take 200 ms or more. Loading a modern web page for the first time usually requires 10 or more individual queries, and page rendering is usually being blocked until the slowest request has completed. Additionally, the intermediary proxy computer(s) 304 can individually and intelligently obfuscate code served to a user device, making it difficult or impossible to separate this code from the code that renders the page and/or from identifying a source of this code. Any suitable combination of the techniques described above would defeat various ad-blocking software.

Figure 4:
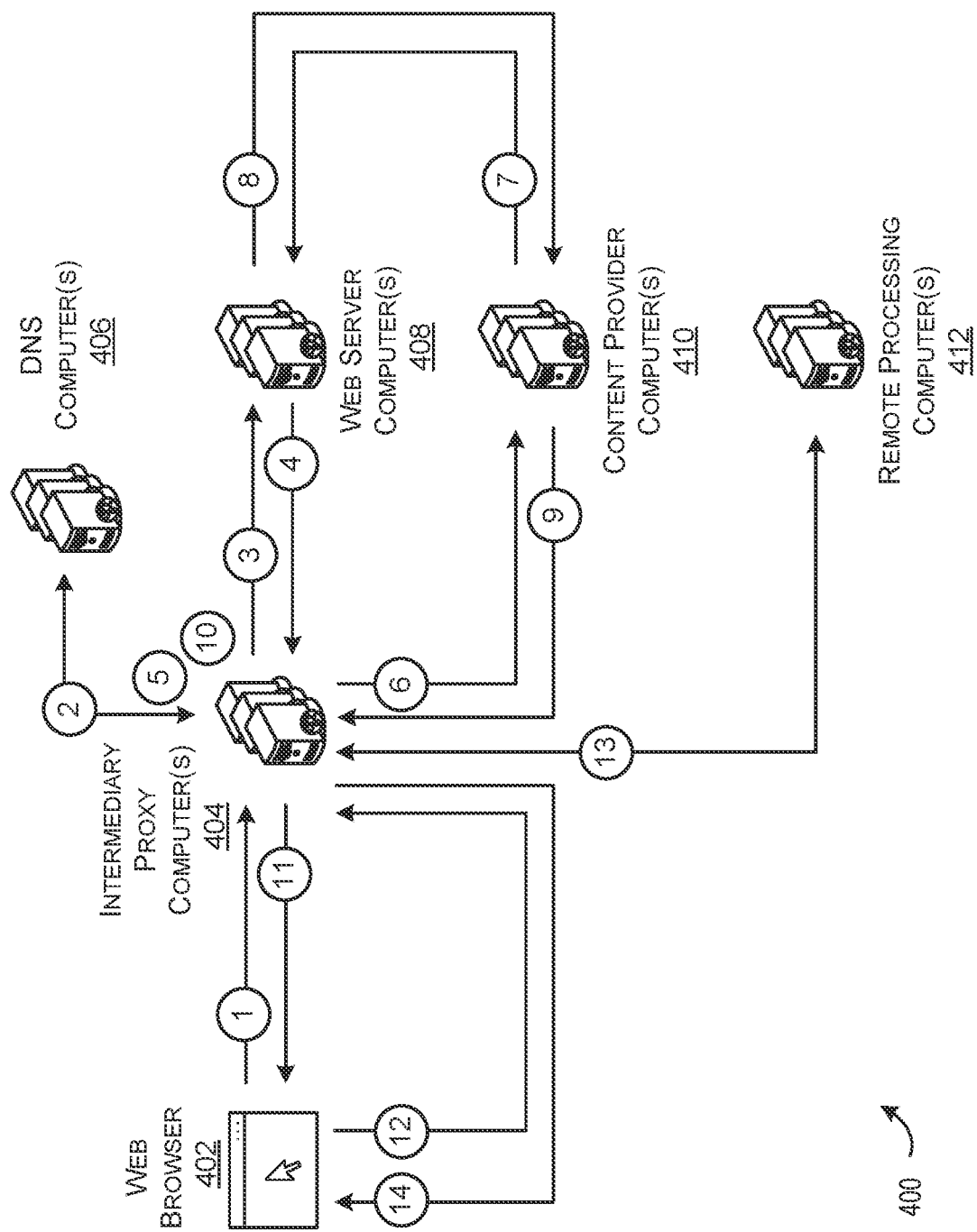
FIG. 4 is a flow illustrating yet another example method for rendering content at an application executing on a user device, in accordance with at least one embodiment.

FIG. 4 is a flow illustrating another example method 400 for rendering content at an application (e.g., a web browser 402, an example of the web browsers 202 and 302 of FIGS. 2 and 3, respectively) executing on a user device utilizing an intermediary proxy computer(s) 404 (e.g., intermediary proxy computer(s) 304 of FIG. 3, an example of the intermediary proxy computer(s) 106 of FIG. 1), in accordance with at least one embodiment. In method 400, not only is the DNS request functionality moved from the web browser 402 to the intermediary proxy computer(s) 404 as described in FIG. 3 but the functionality for obtaining content from content provider computer(s) 410 (e.g., an example of the content provider computer(s) 208 and 310 of FIGS. 2 and 3, respectively) to reduce the overall processing time of the web browser 302. As the intermediary proxy computer(s) 404 likely have faster and/or a greater number of processing resources then accessible to the web browser, and potentially higher bandwidth, lower latency connections to the DNS computer(s) 406 (an example of the DNS computer(s) 204 and 306 of FIGS. 2 and 3, respectively), the web server computer(s) 408 (e.g., an example of the web server computer(s) 308 and 206 of FIGS. 2 and 3, respectively), the content provider computer(s) 410 (e.g., an example of the content provider computer(s) 208 and 310 of FIGS. 2 and 3, respectively), and/or the remote processing computer(s) 412 (e.g., an example of the remote processing computer(s) 210 and 312 of FIGS. 2 and 3, respectively) the intermediary proxy computer(s) 404 are poised to execute operations faster than if those same operations were executed at the web browser 402.

The method 400 may begin at step 1. Steps 1-4 of method 400 generally correspond to steps 1-4 of method 300 described in connection with FIG. 3. At step 5, the intermediary proxy computer(s) 404 may perform any suitable DNS requests with DNS computer(s) 406 in order to obtain the IP addresses of the content provider computer(s) 410 as identified in the web content provided by the web server computer(s) 408. As discussed above, this advertisement placement code (or a reference to a source of the code from which the code can be obtained) may be previously provided to the web server computer(s) 408 from the content provider computer(s) 410. The intermediary proxy computer(s) 404 may execute (or download and execute) the advertisement placement code on behalf of the web browser 402 which may cause the intermediary proxy computer(s) 404 to perform the operations discussed in connection with step 6.

Steps 6-9 of method 400 generally correspond to steps 8-11 of method 300 except that the requests transmitted at step 6 are transmitted by the intermediary proxy computer(s) 404 (instead of the web browser as described in FIG. 3) and the request may utilize the IP addresses obtained from the DNS computer(s) 406 (rather than the hostname of the content provider computer(s) 410.

Once webpage content (e.g., one or more advertisements) are received at step 9, the intermediary proxy computer(s) 404 may forward the webpage content (including the advertisement(s)) to the web browser 402 for display at step 11. In some embodiments, the intermediary proxy computer(s) may be configured to perform additional operations at step 10 prior to forwarding the webpage content.

For example, at step 10, the intermediary proxy computer(s) 404 may be configured to modify at least a portion of the webpage content from one format (e.g., a foreign format in which the webpage content was originally obtained) to another format (e.g., a native format associated with the webpage requested at step 3). In some embodiments, the intermediary proxy computer(s) 404 may be configured to analyze the web content received from web server computer(s) 408 including text, hostnames, images, or the like, to identify a manner by which the web content received from the web server computer(s) 408 is formatted (e.g., to identify a first format). In some embodiments, the intermediary proxy computer(s) 404 may store or access predefined data associated with the page requested at step 3 that identifies the format of the web content provided at that webpage. As a non-limiting example, the webpage requested may be a webpage of a social media platform. Thus, the intermediary proxy computer(s) 404 may be configured to modify the web content (e.g., the advertisements) obtained from the content provider computer(s) 410 from the original format of the web content received at step 9 to the native format associated with the social media platform. Said another way, the intermediary proxy computer(s) 404 can reformat the advertisements from the advertisements original format that the advertisements are formatted to appear to be native content (e.g., content provided by the publisher of the social media platform). In the social media context, the advertisements may be reformatted to look like a social media post provided by a user. In a different context, such as when the web server computer(s) 408 host an online retailer website, the advertisements may be reformatted from their original format to the format associated with the online retailers item details. If the intermediary proxy computer(s) 404 generate native content from webpage content obtained from the content provider computer(s) 410, the intermediary proxy computer(s) 404 may store a mapping of an identifier of the generated native content to the URL and/or IP address of the corresponding remote processing computer(s) 412.

At step 11, the intermediary proxy computer(s) 404 may forward the modified webpage content (e.g., the webpage content provided by the web server computer(s) 408 including the embedded advertisements (reformatted or as originally formatted) that were obtained from the content provider computer(s) 410). In response to receiving the webpage content, the web browser 402 may display the webpage content at a display of the user device on which the web browser executes.

At step 12, user input indicating a selection of a particular portion of web content (e.g., a particular advertisement) may be forwarded to the intermediary proxy computer(s) 404 from the web browser 402. The intermediary proxy computer(s) 404 may perform any suitable number of DNS requests to obtain the IP address of the remote processing computer(s) 412 (e.g., an example of the remote processing computer(s) 210 and 312 of FIGS. 2 and 3, respectively).

At step 13, the intermediary proxy computer(s) 404 may transmit a page request to the remote processing computer(s) 412 and may receive webpage content (e.g., corresponding to a webpage associated with the selected advertisement) in response to its request. If the page request was initiated from native webpage content generated by the intermediary proxy computer(s) 404, the intermediary proxy computer(s) 404 may identify from its mapping, the corresponding URL and/or IP address associated with the corresponding remote processing computer(s) 412. The intermediary proxy computer(s) 404 may once again perform any suitable number of DNS requests to obtain one or more IP addresses corresponding to data identifying a source of a portion of the web content from which the webpage content may be obtained. For example, the webpage content provided by the remote processing computer(s) 412 may indicate a source for a given image. The intermediary proxy computer(s) 404 may then download the image from the source indicated before proceeding to step 13. In some embodiments, if the At step 14, the intermediary proxy computer(s) 404 may transmit the webpage content obtained from the remote processing computer(s) 412 (or any suitable source) to the web browser 402 in response to the request transmitted at step 12.

The techniques described in FIG. 4 would completely move execution of the advertising code to the intermediary proxy computer(s) 404, enabling the advertising code and corresponding functions of the code to be executed faster than if executed by the web browser 402. This solution additionally allows for ad-caching and pre-loading. Because users generally follow a predictable path, or have limited choices of pages they can visit from one page to another, the intermediary proxy computer(s) 404 can pre-load webpage content (e.g., publisher content, advertisements, etc.) to further reduce inter-site page latency. By way of example, the intermediary proxy computer(s) 404 may be configured to predict, based at least in part on the page requested at step 12, one or more subsequent web pages that are likely to be subsequently requested by the web browser 402. The intermediary proxy computer(s) 404 may be configured to transmit a page request to each of these webpages and cache (or otherwise store) the returned webpage content. Thus, if the web browser 402 does in fact request webpage content of one of these webpages, the intermediary proxy computer(s) 404 may execute any suitable ad-fetching operations (or these operations may have already been performed before the webpage content was stored) and provide the webpage content (e.g., publisher web content and/or web content comprising one or more advertisements) to the web browser 402.

In this embodiment, third-party advertisements would appear completely native to the site hosted by the web server computer(s) 408 and the potentially decrease page load times by 50-60% and/or reducing and/or eliminating the risk of having the content be blocked by ad-blocking software, thereby increasing site conversion rates, increasing search-engine ranking, and improving the overall user experience.

Figure 5:
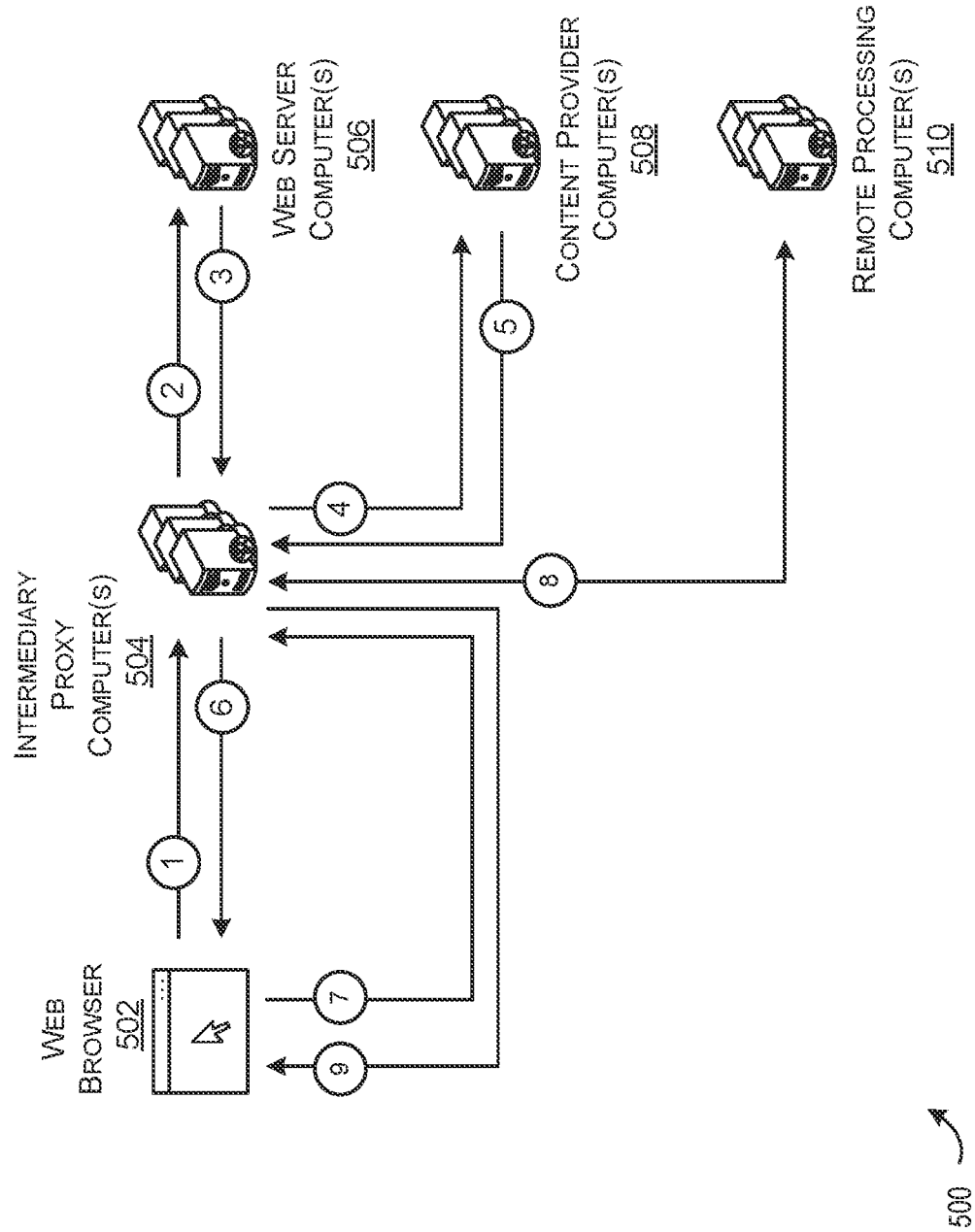
FIG. 5 is a flow illustrating still one further example method for rendering content at an application executing on a user device, in accordance with at least one embodiment.

FIG. 5 is a flow illustrating still one further example method 500 for rendering content at an application (e.g., a web browser 502 and example of the web browsers of FIGS. 3 and 4) executing on a user device (e.g., the user device 102 of FIG. 1), in accordance with at least one embodiment. The intermediary proxy computer(s) 504 may be an example of the intermediary proxy computer(s) of FIGS. 3 and 4. Similarly, the web server computer(s) 506, the content provider computer(s) 508, and the remote processing computer(s) 510 may be individually examples of the web server computer(s), the content provider computer(s), and the remote processing computer(s) of FIG. 204, respectively. Although not depicted, the DNS requests may be performed by the intermediary proxy computer(s) 504 in a similar manner as discussed above in connection with FIGS. 3 and 4. Steps 1 and 2 of the method 500 may generally correspond to steps 1-3 of FIGS. 3 and 4. The webpage content requested from the publisher of the webpage may be received at step 3. However, unlike in the previous examples, in some embodiments, the webpage content received at step 3 may include advertisement identifiers rather than advertisement placement code (or a reference from which the advertisement placement code may be downloaded). Instead, publishers may have previously inserted ad tags to indicate aspects of the advertisement to be provided in the corresponding space within the web content. As a simplistic example, an example tag may be [Ad size="320×200" ] which would indicate a size associated with the ad to be selected.

In some embodiments, the intermediary proxy computer(s) 504 and the content provider computer(s) 508 operate as part of a cloud computing environment and/or an advertisement provider. By way of example, in some embodiments, the intermediary proxy computer(s) 504 may be a cloud computing environment that operates as a broker between web server computer(s) 506 and content provider computer(s) 410.

At step 4, the intermediary proxy computer(s) 504 may request that the content provider computer(s) 508 replace the ad tag with an appropriate advertisement. The advertisements obtained by the content provider computer(s) 410 may be native looking with respect to the webpage requested at step 1, and thus, undetectable by ad-blocking software. In some embodiments, the content provider computer(s) 508 may utilize any suitable data of the ad tag to identify a suitable advertisement. In some embodiments, the web page content is provided with the ad tag to the content provider computer(s) 508 which in turn may be configured to utilize any suitable combination of the ad tag and/or the webpage content to select appropriate replacement content (e.g., an ad with which the ad tag is replaced). In yet another embodiment, the content provider computer(s) 508 may be configured to request webpage content from the web server computer(s) 506 with which a selection of one or more advertisements may be made (while also utilizing the data provided in the ad tag(s)).

At step 5, the webpage content, if provided at step 4, may be returned with the ad tags replaced with the selected ad(s). In other embodiments, the ad tags may be provided to the content provider computer(s) 508 at step 5 and the selected advertisement(s) may be provided to the intermediary proxy computer(s) 504 which in turn may itself replace the ad tags with the selected advertisements.

At step 6, the intermediary proxy computer(s) 504 may provide the webpage content (now including one or more advertisements) to the web browser 502. The steps 7-9 are substantially similar to steps 12-14 of FIG. 5.

Figure 6:
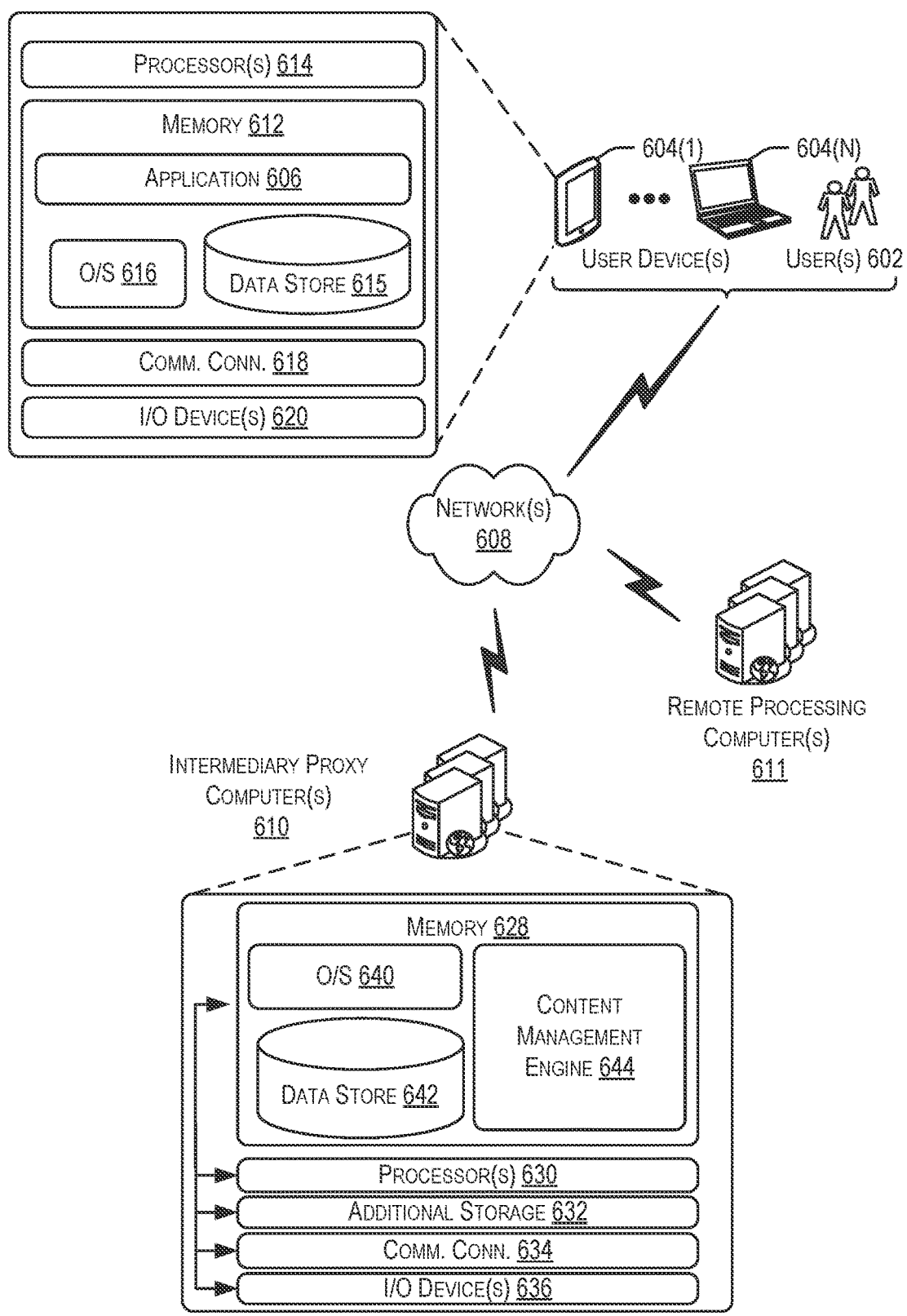
FIG. 6 illustrates components of a content management system, in accordance with at least one embodiment.

FIG. 6 illustrates components of a system 600 according to a particular embodiment. In system 600, one or more user(s) 602 may utilize a user device (e.g., a user device of a collection of user device(s) 604 to access a user interface accessible through an application 606 running on the user device(s) 604 via one or more network(s) 608. In some aspects, the application 606 operating on the user device(s) 604 may be hosted, managed, and/or provided by a computing resources service or service provider, such as by utilizing one or more intermediary proxy computer(s) 610. In some embodiments, the application 606 may be a web browser (e.g., any suitable software application that is configured to access data on the World Wide Web/the Internet). When the user(s) 602 request a webpage (e.g., webpage content associated with a particular webpage), the application 606 may be configured to transmit a request to intermediary proxy computer(s) 610 and/or remote processing computer(s) 611. In some embodiments, the intermediary proxy computer(s) 610 may intercept a request directed to the remote processing computer(s) 611. The remote processing computer(s) 611 may include any suitable combination of one or more web servers, advertisement computer(s) and/or networks, domain name system (DNS) computer(s), or the like. As used herein, a DNS computer may be any suitable device (e.g., recursive resolvers, root name servers, top level domain (TLD) name servers, and/or authoritative name servers) configured to translate domain names and/or hostnames to their corresponding numeric internet protocol (IP) addresses from which content may be obtained.

In some examples, the network(s) 608 may include any one or a combination of many different types of networks, such as cable networks, the Internet, wireless networks, cellular networks, and other private and/or public networks. While the illustrated example represents the user(s) 602 accessing application functionality over the network(s) 608, the described techniques may equally apply in instances where the user(s) 602 interact with the intermediary proxy computer(s) 610 via the one or more user device(s) 604 over a landline phone, via a kiosk, or in any other suitable manner. It should be appreciated that the described techniques may apply in other client/server arrangements, as well as in non-client/server arrangements (e.g., locally stored applications, etc.). Additionally, in some embodiments, the content management engine 644, discussed further below in more detail, may operate in whole or in part on the user device(s) 604. Thus, in some embodiments, the user(s) 602 may access the functionality of the content management engine 644 directly through the user device(s) 604 and/or the intermediary proxy computer(s) 610 via user interfaces provided by the content management engine 644.

The intermediary proxy computer(s) 610, perhaps arranged in a cluster of servers or as a server farm, may host the application 606 operating on the user device(s) 604 and/or cloud-based software services. Other server architectures may also be used to host the application 606 and/or cloud-based software services. The application 606 operating on the user device(s) 604 may be capable of handling requests from the user(s) 602 and serving, in response, various user interfaces that can be rendered at the user device(s) 604. The application 606 operating on the user device(s) 604 can present any suitable type of website that supports user interaction, including search engine sites, news websites, social media websites, and the like. The described techniques can similarly be implemented outside of the application 606, such as with other applications running on the user device(s) 604.

The user device(s) 604 may be any suitable type of computing device such as, but not limited to, a mobile phone, a hand-held scanner, a touch screen device, a smartphone, a personal digital assistant (PDA), a laptop computer, a desktop computer, a thin-client device, a tablet PC, an electronic book (e-book) reader, etc. In some examples, the user device(s) 604 may be in communication with the intermediary proxy computer(s) 610 via the network(s) 608, or via other network connections.

In one illustrative configuration, the user device(s) 604 may include at least one memory 612 and one or more processing units (or processor(s)) 614. The processor(s) 614 may be implemented as appropriate in hardware, computer-executable instructions, firmware, or combinations thereof. Computer-executable instruction or firmware implementations of the processor(s) 614 may include computer-executable or machine-executable instructions written in any suitable programming language to perform the various functions described.

The memory 612 may store program instructions that are loadable and executable on the processor(s) 614, as well as data generated during the execution of these programs. Depending on the configuration and type of user computing device, the memory 612 may be volatile (such as random access memory (RAM)) and/or non-volatile (such as read-only memory (ROM), flash memory, etc.). The user device(s) 604 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 612 may include multiple different types of memory, such as static random access memory (SRAM), dynamic random access memory (DRAM), or ROM.

Turning to the contents of the memory 612 in more detail, the memory 612 may include an operating system 616, one or more data stores 615, and one or more application programs, modules, or services provided via the application 606 (e.g., a web browser application, a shopping application associated with an online retailer, etc.). The application 606 may be configured to receive, store, and/or display a network page or other interfaces for interacting with the intermediary proxy computer(s) 610. The application 606 may include any suitable functionality for interacting with the intermediary proxy computer(s) 610. Additionally, the memory 612 may store access credentials and/or other user information such as, but not limited to, user IDs, passwords, and/or other user information. In some examples, the user information may include information for authenticating an account access request such as, but not limited to, a device ID, a cookie, an IP address, a location, or the like.

The user device(s) 604 may also contain communications connection(s) 618 that allow the user device(s) 604 to communicate with a stored database, another computing device or server (e.g., the intermediary proxy computer(s) 610), user terminals and/or other devices on the network(s) 608. The user device(s) 604 may also include I/O device(s)

620, such as a keyboard, a mouse, a pen, a voice input device, a touch input device, a display, speakers, a printer, etc.

In some aspects, the intermediary proxy computer(s) 610 may also be any suitable type of computing devices such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the intermediary proxy computer(s) 610 are executed by one more virtual machines implemented in a hosted computing environment. The hosted computing environment may include one or more rapidly provisioned and released computing resources, which computing resources may include computing, networking and/or storage devices. A hosted computing environment may also be referred to as a cloud-computing environment. In some examples, the intermediary proxy computer(s) 610 may be in communication with the user device(s) 604 and/or other service providers via the network(s) 608 or via other network connections. The intermediary proxy computer(s) 610 may include one or more servers, perhaps arranged in a cluster, as a server farm, or as individual servers not associated with one another. These servers may be configured to implement the functionality described herein as part of an integrated, distributed computing environment.

In one illustrative configuration, the intermediary proxy computer(s) 610 may include at least one memory 628 and one or more processing units (or processor(s)) 630. The processor(s) 630 may be implemented as appropriate in hardware, computer-executable instructions, firmware, or combinations thereof computer-executable instruction or firmware implementations of the processor(s) 630 may include computer-executable or machine-executable instructions written in any suitable programming language to perform the various functions described.

The memory 628 may store program instructions that are loadable and executable on the processor(s) 630, as well as data generated during the execution of these programs. Depending on the configuration and type of intermediary proxy computer(s) 610, the memory 628 may be volatile (such as RAM) and/or non-volatile (such as ROM, flash memory, etc.). The intermediary proxy computer(s) 610 or servers may also include additional storage 632, which may include removable storage and/or non-removable storage. The additional storage 632 may include, but is not limited to, magnetic storage, optical disks and/or tape storage. The disk drives and their associated computer-readable media may provide non-volatile storage of computer-readable instructions, data structures, program modules, and other data for the computing devices. In some implementations, the memory 628 may include multiple different types of memory, such as SRAM, DRAM, or ROM.

The memory 628, the additional storage 632, both removable and non-removable, are all examples of computer-readable storage media. For example, computer-readable storage media may include volatile or non-volatile, removable or non-removable media implemented in any method or technology for storage of information such as computer-readable instructions, data structures, program modules, or other data. The memory 628 and the additional storage 632 are all examples of computer storage media. Additional types of computer storage media that may be present in the intermediary proxy computer(s) 610 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the intermediary proxy computer(s) 610. Combinations of any of the above should also be included within the scope of computer-readable media.

Alternatively, computer-readable communication media may include computer-readable instructions, program modules, or other data transmitted within a data signal, such as a carrier wave, or other transmission. However, as used herein, computer-readable storage media does not include computer-readable communication media.

The intermediary proxy computer(s) 610 may also contain communications connection(s) 634 that allow the intermediary proxy computer(s) 610 to communicate with a stored database, another computing device or server (e.g., remote processing computer(s) 611, any of which may be an example of the web server computer(s), content provider computer(s), and/or remote processing computer(s) (e.g., associated with advertisers) of any example provided in above in connection with FIGS. 1 and 3-5), user terminals and/or other devices on the network(s) 608. The intermediary proxy computer(s) 610 may also include I/O device(s) 636, such as a keyboard, a mouse, a pen, a voice input device, a touch input device, a display, speakers, a printer, etc.

Turning to the contents of the memory 628 in more detail, the memory 628 may include an operating system 640, one or more data stores 642, and/or one or more application programs, modules, or services for implementing the features disclosed herein, such as the features provided by the content management engine 644. The content management engine 644 may be configured to perform the operations discussed above in connection with FIGS. 1-5.

Figure 7:
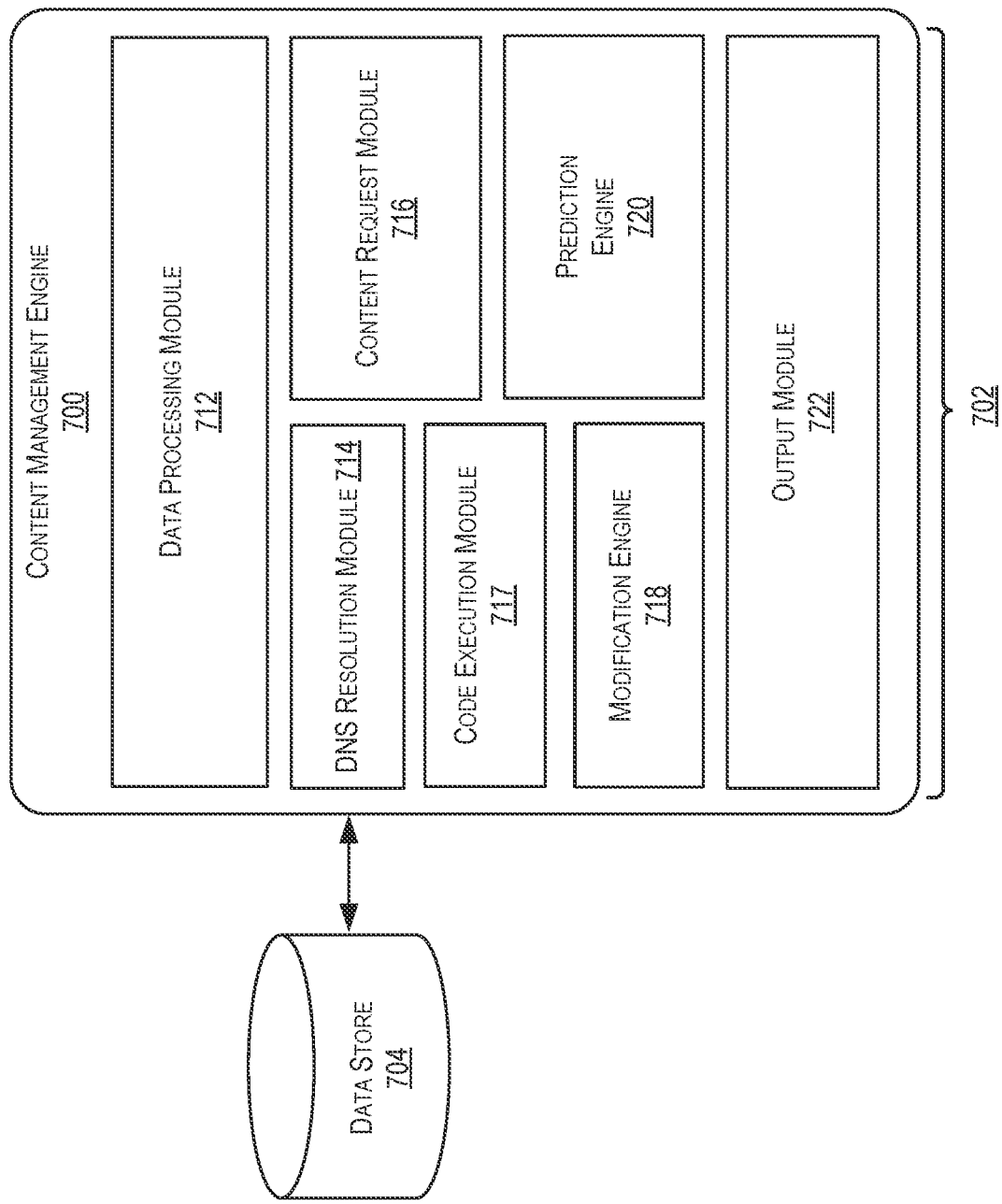
FIG. 7 is a schematic diagram of an example computer architecture for a content management engine, including a plurality of modules that may perform functions in accordance with at least one embodiment.

FIG. 7 is a schematic diagram of an example computer architecture for a content management engine 700 (e.g., the content management engine 644 of FIG. 6), including a plurality of modules 702 that may perform functions in accordance with at least one embodiment. The modules 702 may be software modules, hardware modules, or a combination thereof. If the modules 702 are software modules, the modules 702 can be embodied on a computer readable medium and processed by a processor in any of the computer systems described herein. It should be noted that any module or data store described herein, may be, in some embodiments, be a service responsible for managing data of the type required to make corresponding calculations. The modules 702 may be exist as part of the content management engine 644 operating on the intermediary proxy computer(s) 610 of FIG. 6, or the modules may exist as separate modules or services external to the intermediary proxy computer(s) 610 (e.g., as part of the application 606 of FIG. 6 operating on the user device(s) 604 of FIG. 6). The content management engine 700 may perform any suitable operations discussed above in connection with FIGS. 1 and 2-6.

In the embodiment shown in the FIG. 7, a data store 704 is shown, although content data can be maintained, derived, or otherwise accessed from various data stores, either remote or local to the content management engine 700, to achieve the functions described herein. In at least one embodiment, the data stores described herein may be physically located on the user device(s) 604 or alternatively, any suitable combination of the data stores may be operated as part of the intermediary proxy computer(s) 710, for example, as part of a content management engine 700. The content management engine 700, as shown in FIG. 7, includes various modules such as a data processing module 712, DNS resolution module 714, content request module 716, code execution module 717, modification engine 718, prediction engine 720, and output module 722. Some functions of the modules 702 are described below. However, for the benefit of the reader, a brief, non-limiting description of each of the modules is provided in the following paragraphs. In accordance with at least one embodiment, a process is identifying potential feature combinations for a new item.

In at least one embodiment, the content management engine 700 includes the data processing module 712. Generally, the data processing module 712 may be utilized to receive any suitable information with respect to any example provided herein. The data processing module 712 may include any suitable number of application programming interfaces with which the functionality of the content management engine 700 may be invoked.

In some embodiments, the data processing module 712 may be configured to receive page requests from an application (e.g., a web browser) operating at a user device. For example, the data processing module 712 may be configured to receive the page requests discussed at step 1 of FIGS. 3-5. In some embodiments, the data processing module 712 may invoke the functionality of any suitable combination of the remaining modules 702.

In some embodiments, the DNS resolution module 714 may be configured to initiate one or more DNS requests for a requested webpage as discussed at step 2 of FIGS. 3 and 4. In some embodiments, the DNS resolution module 714 may be configured to identify any suitable data identifying a source of webpage content (e.g., from webpage content obtained from the web server computer(s) of FIGS. 3 and 4) and to initiate a DNS request for the source. In some embodiments, the DNS resolution module 714 may be configured to receive any suitable DNS response from a DNS computer (e.g., the DNS computer(s) of FIGS. 3 and 4). The response received by the DNS resolution module 714 may include one or more IP addresses corresponding to the source(s) of the webpage content. These IP addresses may be stored in data store 704 and/or passed to any suitable module of the modules 702. By way of example, the IP addresses may be passed to content request module 716.

In some embodiments, the content request module 716 may be configured to perform any suitable functionality discussed in connections with FIGS. 3-5 corresponding to requesting content (e.g., publisher content, advertisements) from any suitable webpage content source (e.g., the web server computer(s) and/or the content provider computer(s) of FIGS. 3-5. In some embodiments, the content request may include webpage content (or attributes of the webpage content such as the publisher of the webpage content, information about the items or content of the webpage, etc.) obtained from a webpage server computer (or ascertained from the webpage content provided by the webpage server computer. In some embodiments, the content request may include any suitable user-specific data (e.g., user demographics, cookies, historical user behavior, etc.). The content request module 716 may be configured to utilize the IP addresses provided by the DNS resolution module 714 and/or stored in the data store 704 when requesting content from one or more content sources (e.g., web server computer(s) and/or content provider computer(s)).

In some embodiments, the code execution module 717 may perform any suitable operations for executing third-party code received in the webpage content. By way of example, webpage content received from a publisher may include embedded advertisement code that, when executed, requests an advertisement from a third party (e.g., an advertisement network). In some embodiments, the code execution module 717 may be configured to identify this code within the webpage content received from the publisher and obtained by the content request module 716 and execute the code on behalf of the user/user device. The code execution module 717 may be configured to receive one or more of the requested advertisement from the advertisement network and embed the received advertisements in the webpage content before the modified webpage content is transmitted to the user device.

In some embodiments, the modification engine 718 may be configured to perform any modification of the webpage content discussed above in connection with FIGS. 3-5. By way of example, if the webpage content includes advertisement placement code, and the content management engine 700 is not executing that code on behalf of the user/user device, the modification engine 718 may be configured to execute any suitable operations to obfuscate such code such that the source of the code and/or the code itself is unidentifiable by ad-blocking software. The operations performed by the modification engine 718 may utilize user-specific data as described in connection with FIG. 3 such that the obfuscation performed for one user of webpage content is not the same as the obfuscation performed for the same webpage content (e.g., advertisement placement code) provided to another user. In some embodiments, the modification engine 718 may modify webpage content (advertisements) from one format (e.g., the foreign format in which the advertisement was originally provided) to a different format (e.g., a native format associated with the publisher) such that the webpage content may appear to be native to the requested webpage.

In some embodiments, the modification engine may be configured to re-host the content provided from the content provider computer(s) (e.g., one or more advertisements). In some embodiments, re-hosting the content may include downloading the content and storing the content at a location that differs from the original source of the content (e.g., an advertisement network). This location may be local or remote with respect to the content management engine. In some embodiments, the modification engine 718 may modify the content to indicate the new location at which the content is stored rather than including data identifying the original source of the content.

In some embodiments, the prediction engine 720 may be configured to train a model to predict one or more webpages that are likely to be subsequently visited by the user based at least in part on the webpage currently being requested. The prediction engine 720 may obtain training data from the data store 704. In some embodiments, the training data may include historical navigation data indicating a series of webpages selected by a user in a past web browsing session). The prediction engine 720 may be configured to train and/or retrain a model utilizing the training set and any suitable machine-learning algorithm (e.g., a supervised learning algorithm). In other embodiments, the prediction engine 720 may simply access a model that has previously been trained by a separate system and stored in the data store 704.

Once the prediction engine 720 has trained and/or obtained a model, the prediction engine 720 may be utilized to predict one or more webpages that the user is likely to select within at threshold period of time (e.g., the next five minutes, the next 15 minutes, etc.). The prediction engine 720 may be configured to invoke the functionality of the content request module 716 and/or the modification engine

718 such that webpage content may be requested (e.g., by the content request module 716) which corresponds to the predicted webpages According to some embodiments, the output module 722 may be configured to transmit any suitable webpage content (e.g., obfuscated and/or reformatted) content to a requesting device (e.g., a web browser operating at a user device). In some embodiments, the output module 722 may simply transmit the webpage content obtained from any suitable number of remote processing computer(s) as discussed in connection with the figures above.

Figure 8:
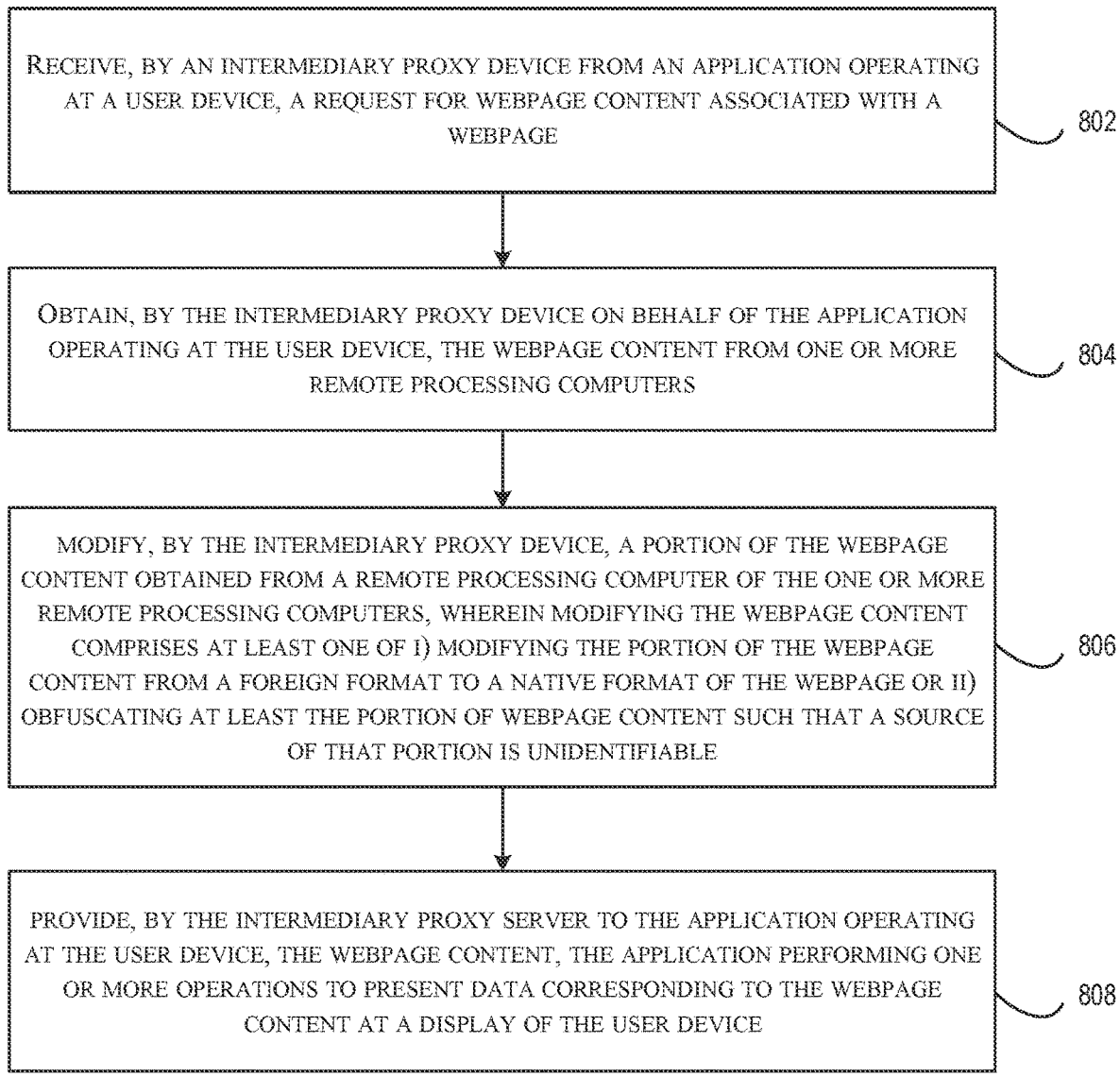
FIG. 8 is a flowchart illustrating an example method for accelerating page rendering at a user device, in accordance with at least one embodiment.

FIG. 8 is a flowchart illustrating an example method 800 for accelerating page rendering at a user device, in accordance with at least one embodiment. A computer-readable medium may store computer-executable instructions that, when executed by at least one processor, cause at least one computer to perform instructions comprising the operations of the method 800. It should be appreciated that the operations of the method 800 may be performed in any suitable, not necessarily the order depicted in FIG. 8. Further, the method 800 may include additional, or fewer operations than those depicted in FIG. 8. The operations of method 800 may be performed by any suitable combination of the modules 702 of the content management engine 700 of FIG. 7 which may operate in whole or in part on a user device (e.g., one or more of the user device(s) 604 of FIG. 6) and/or the intermediary proxy computer(s) 610 of FIG. 6.

The method 800 may begin at 802, where a request for webpage content associated with a webpage may be received (e.g., by the data processing module 712 of FIG. 7) by an intermediary proxy device (e.g., the intermediary proxy computer(s) of FIGS. 3-6) from an application (e.g., web browsers of FIGS. 3-5) operating at a user device (e.g., the user device 102 of FIG. 1, the user device(s) 604 of FIG. 6), a request for webpage content associated with a webpage. By way of example, the webpage may be associated with a publisher (e.g., an entity that publishes original content on the webpage).

At 804, the webpage content may be obtained (e.g., by the content request module 716 of FIG. 7), by the intermediary proxy device on behalf of the application, from one or more remote processing computers.

At 806, a portion of the webpage content, obtained from a remote processing computer of the one or more remote processing computers, may be modified (e.g., by the modification engine 718 of FIG. 7) by the intermediary proxy device. In some embodiments, intermediary proxy device modifies the portion of the webpage content from a first format (e.g., a format in which the webpage content obtained from the remote processing computer was obtained) to a second format (a native format associated with the webpage). In some embodiments, the portion of the webpage content may refer to one or more advertisements that are modified (e.g., by the modification engine 718) such that they appear to be in the native format associated with the webpage. As a different example, modifying the portion of the webpage content from a first format to a second format may include performing obfuscation operations to change the webpage content from a first format (non-obfuscated code) to a second format (obfuscated code. In some embodiments, the portion of the webpage content that is modified (e.g., obfuscated) may refer to advertisement placement code as discussed in connection with FIG. 3.

At 808, the webpage content (e.g., as modified) may be provided by the intermediary proxy server to the application operating at the user device. In some embodiments, the application performs one or more operations to present data corresponding to the webpage content at a display of the user device. In some embodiments, the application performs de-obfuscation of advertisement placement code as discussed in connection with FIG. 3. The application may then execute the de-obfuscated advertisement placement code (e.g., utilizing the IP addresses obtained by the intermediary proxy server as discussed in connection with FIG. 3). In other embodiments, the application simply performs operations to present the content provided by the intermediary proxy server at a display of the user device.

Figure 9:
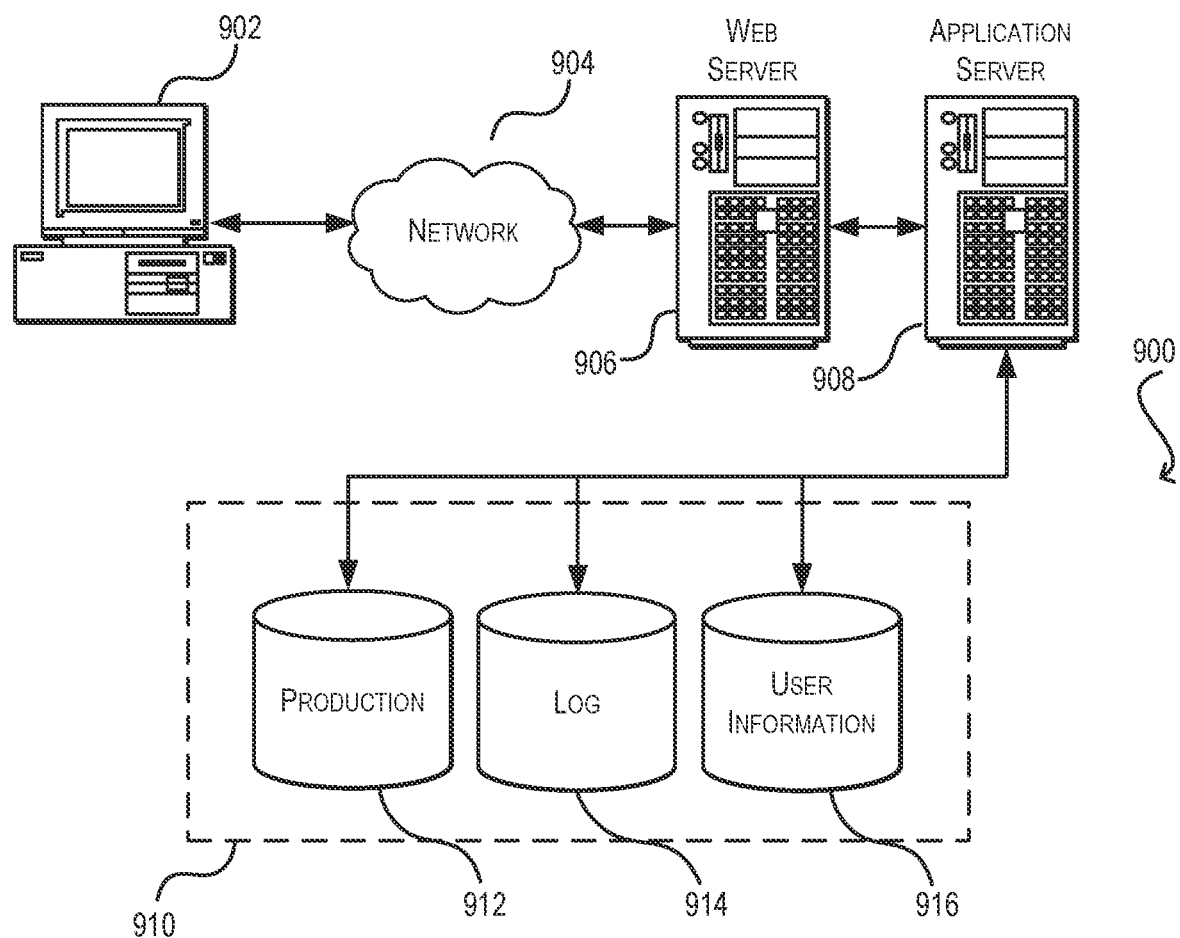
FIG. 9 illustrates an environment in which various embodiments can be implemented.

FIG. 9 illustrates aspects of an example environment 900 for implementing aspects in accordance with various embodiments. As will be appreciated, although a Web-based environment is used for purposes of explanation, different environments may be used, as appropriate, to implement various embodiments. The environment includes a user device 902, which can include any appropriate device operable to send and receive requests, messages, or information over an appropriate network 904 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 906 for receiving requests and serving content in response thereto, although for other networks an alternative device serving a similar purpose could be used as would be apparent to one of ordinary skill in the art.

The illustrative environment includes at least one application server 908 and a data store 910. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the user device 902 and the application server 908, can be handled by the Web server. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing production data 912 and user information 916, which can be used to serve content for the production side. The data store also is shown to include a mechanism for storing log data 914, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Webpage that the user is able to view via a browser on the user device 902. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the environment 900 in FIG. 9 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk®. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
receiving, by an intermediary proxy device from an application operating at a user device, a request for webpage content associated with a webpage, the webpage being received from a first content provider;
obtaining, by the intermediary proxy device on behalf of the application, the webpage content from one or more remote processing computers, a portion of the webpage content being received from a second content provider;
modifying, by the intermediary proxy device, the portion of the webpage content obtained from a remote processing computer of the one or more remote processing computers, the intermediary proxy device modifying the portion of the webpage content from a foreign format to a native format of the webpage, the foreign format being different from the native format of the webpage, and the modifying of the portion of the webpage content causing the webpage content to appear as if provided by the first content provider; and
providing, by the intermediary proxy device to the application operating at the user device, the webpage content, the application being configured to perform one or more operations to present data corresponding to the webpage content at a display of the user device.

2. The computer-implemented method of claim 1, wherein obtaining the webpage content further comprises:
obtaining, by the intermediary proxy device from a webserver of the one or more remote processing servers, native webpage content provided by a publisher, the publisher being the first content provider;
obtaining, by the intermediary proxy device from a content provider computer of the one or more remote processing servers, foreign webpage content provided by a content provider, the content provider being the second content provider; and embedding the foreign webpage content within the native webpage content to generate the webpage content.

3. The computer-implemented method of claim 2, further comprising modifying one or more hostnames of the webpage content to one or more corresponding internet protocol addresses.

4. The computer-implemented method of claim 1, wherein modifying the portion of the webpage content further comprises obfuscating at least another portion of the webpage content.

5. A system, comprising:
a web server;
a content server;
a user device; and
an intermediary proxy device, the intermediary proxy device comprising:
  one or more processors; and
  one or more memories storing computer-executable instructions that, when executed by the one or more processors, cause the intermediary proxy device to perform operations comprising:
    obtaining, on behalf of an application operating at the user device, first webpage content and second webpage content for a webpage associated with a first content provider, the first webpage content being received from the web server, the second webpage content being received from the content server and associated with a second content provider;
    modifying the second webpage content obtained from the content server from a first format to a second format, wherein modifying the second webpage content comprises modifying the second webpage content from a foreign format to a native format of the webpage, the foreign format being different from the native format of the webpage, and the modifying of the second webpage content causing the second webpage content to appear as if provided by the first content provider; and
    providing, to the application operating at the user device, the first webpage content and the second webpage content as modified, the application being configured to perform one or more operations to present data at a display of the user device in response to receiving the first webpage content and the second webpage content as modified.

6. The system of claim 5, wherein the operations further comprise performing a resolution process that converts a hostname identifier of the first webpage content or the second webpage content of the webpage to an internet protocol (IP) address corresponding to the hostname identifier.

7. The system of claim 5, wherein obtaining the second webpage content comprises executing third-party code of the first webpage content on behalf of the application.

8. The system of claim 7, wherein the second webpage content is not obfuscated when the second webpage content is obtained through executing the third-party code on behalf of the application.

9. The system of claim 5, wherein the data comprises the first webpage content and the second webpage content, and wherein utilizing the intermediary proxy device to provide the first webpage content and the second webpage content causes the data to be loaded by the application in less time than if the intermediary proxy device was not used.

10. The system of claim 5, wherein the operations further comprise:
receiving a webpage request comprising one or more content identifiers; and
obtaining, from a content provider, the second webpage content based at least in part on the one or more content identifiers.

11. The system of claim 10, wherein a content identifier of the one or more content identifiers identifies at least one attribute of the second webpage content being requested.

12. A computer-readable storage medium comprising one or more memories storing executable instructions that, when executed by a computing device, cause the computing device to perform operations comprising:
receiving, from an application operating at a user device, a request for webpage content to be presented on a webpage;
obtaining, on behalf of the application, first webpage content and second webpage content, the first webpage content being received from a first webpage content provider and the second webpage content being received from a second webpage content provider that is different from the first webpage content provider;
modifying the second webpage content from a foreign format to a native format of the webpage, the modifying of the second webpage content causing the second webpage content to appear as if provided by the first webpage content provider;
providing, to the application operating at the user device, the first webpage content and the second webpage content as modified, the application being configured to display data comprising the first webpage content and the second webpage content as modified;
receiving, from the application, an indication that the second webpage content as modified was selected; and
obtaining, on behalf of the application, subsequent webpage content corresponding to a different webpage based at least in part on the selection.

13. The computer-readable storage medium of claim 12, wherein the operations further comprise:
identifying future webpage content corresponding to a potential selection yet to be made via the application;
obtaining additional webpage content corresponding to the potential selection; and
storing the additional webpage content at a location accessible to the computing device.

14. The computer-readable storage medium of claim 13, wherein identifying the future webpage content corresponding to the potential selection is based at least in part on utilizing a machine-learning model, the machine-learning model being previously trained with historical browsing data of one or more users.

15. The computer-readable storage medium of claim 12, wherein the second webpage content is obtained based at least in part on executing third-party code included in the first webpage content.

16. The computer-readable storage medium of claim 12, wherein the content provider is an advertisement network.

17. The computer-readable storage medium of claim 16, wherein the operations further comprise:
resolving a hostname associated with the provider to an internet protocol (IP) address associated with the provider; and
transmitting, to the content provider, a content request for the second webpage content, the content request comprising the IP address associated with the provider.

18. The computer-readable storage medium of claim 17, wherein resolving the hostname to the IP address comprises:

transmitting, to a domain name server, a domain name service (DNS) request corresponding to the provider of the first webpage content; and receiving the IP address in response to the DNS request.

19. The computer-readable storage medium of claim 17, wherein the operations further comprise replacing the hostname of the second webpage content with geo-corrected internet protocol address associated with the hostname.

20. The computer-implemented method of claim 1, further comprising identifying the native format of the webpage based at least in part on at least two of: text, a hostname, or an image of the webpage content.

\* \* \* \* \*